United States Patent [19]
Berz et al.

[11] 3,871,846
[45] Mar. 18, 1975

[54] DUST FILTER ARRANGEMENT

[75] Inventors: Max Berz; Wolfgang Berz, both of Kochel am See, Germany

[73] Assignee: Wolfgang Berz, Kochel am See, Germany

[22] Filed: Apr. 1, 1974

[21] Appl. No.: 456,862

Related U.S. Application Data

[63] Continuation of Ser. No. 208,269, Dec. 15, 1971, abandoned, which is a continuation-in-part of Ser. No. 143,130, May 13, 1971, abandoned, which is a continuation-in-part of Ser. No. 777,454, Nov. 20, 1968, Pat. No. 3,594,991, which is a continuation-in-part of Ser. No. 491,670, Sept. 30, 1965, abandoned.

[30] Foreign Application Priority Data

| Dec. 30, 1970 | Germany | 2064611 |
| Jan. 14, 1971 | Germany | 2101606 |
| Apr. 7, 1971 | Germany | 2117088 |
| Apr. 13, 1971 | Germany | 2117834 |

[52] U.S. Cl. ................ 55/303, 55/343, 55/474, 55/512
[51] Int. Cl. ........................................... B01d 46/00
[58] Field of Search ............ 55/291, 302, 303, 343, 55/350, 474, 512

[56] References Cited
UNITED STATES PATENTS

| 418,186 | 12/1889 | Jewell | 210/276 |
| 1,416,995 | 5/1922 | Stroud | 55/343 |
| 2,498,832 | 2/1950 | Watson et al. | 209/144 |
| 2,911,065 | 11/1959 | Yellott et al. | 55/343 |
| 2,995,204 | 8/1961 | Prostshakov | 55/474 |
| 3,057,137 | 10/1962 | Perlis et al. | 55/303 |
| 3,097,936 | 7/1963 | Lincoln | 55/302 |
| 3,146,080 | 8/1964 | Ruble et al. | 55/302 |
| 3,239,061 | 3/1966 | Horning et al. | 210/80 |
| 3,564,570 | 2/1971 | Lincoln et al. | 55/286 |
| 3,577,705 | 5/1971 | Sharlit | 55/304 |
| 3,594,991 | 7/1971 | Berz et al. | 55/294 |

FOREIGN PATENTS OR APPLICATIONS

| 1,592,027 | 6/1970 | France | 55/337 |
| 903,890 | 2/1954 | Germany | 55/302 |
| 778,537 | 7/1957 | United Kingdom | 55/282 |
| 936,488 | 9/1963 | United Kingdom | 55/303 |

*Primary Examiner*—Bernard Nozick
*Attorney, Agent, or Firm*—Hans Berman

[57] ABSTRACT

A battery of filter chambers, each divided into an upper and a lower compartment by a filter bed of granular material supported on a foraminous sheet has a purified gas manifold permanently communicating with the several lower compartments and valves associated with respective upper compartments for alternatively connecting the upper compartments with a raw gas intake or a scavenging gas discharge conduit. A preliminary separator in the intake removes suspended coarse particles from the raw gas, and a separator in the scavenging gas discharge conduit separates solid particles from the scavenging gas flowing from the upper compartment. The suction port of a circulating fan is connected to the scavenging gas conduit, and its pressure port is connected to the raw gas intake. An exhaust fan draws raw gas into the intake and discharges purified gas from the manifold.

5 Claims, 14 Drawing Figures

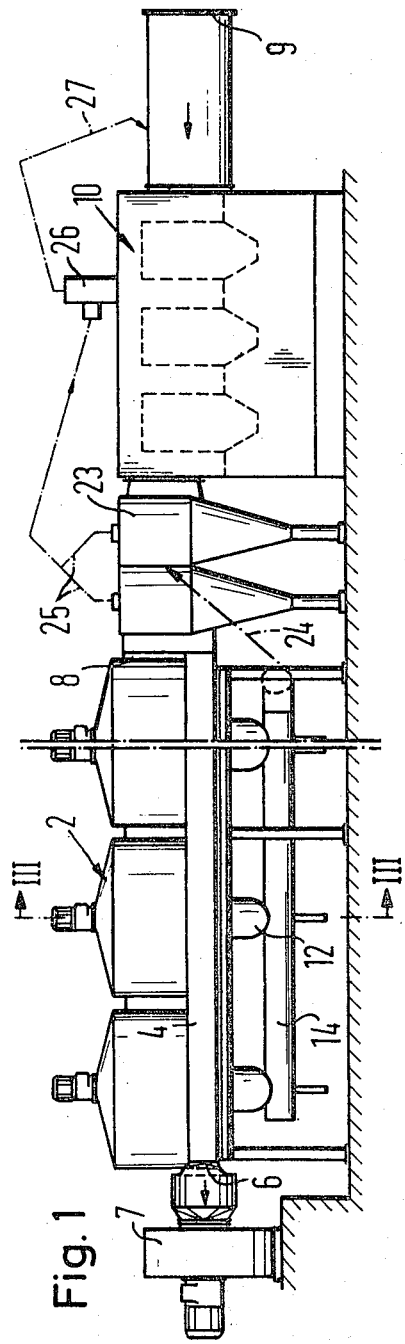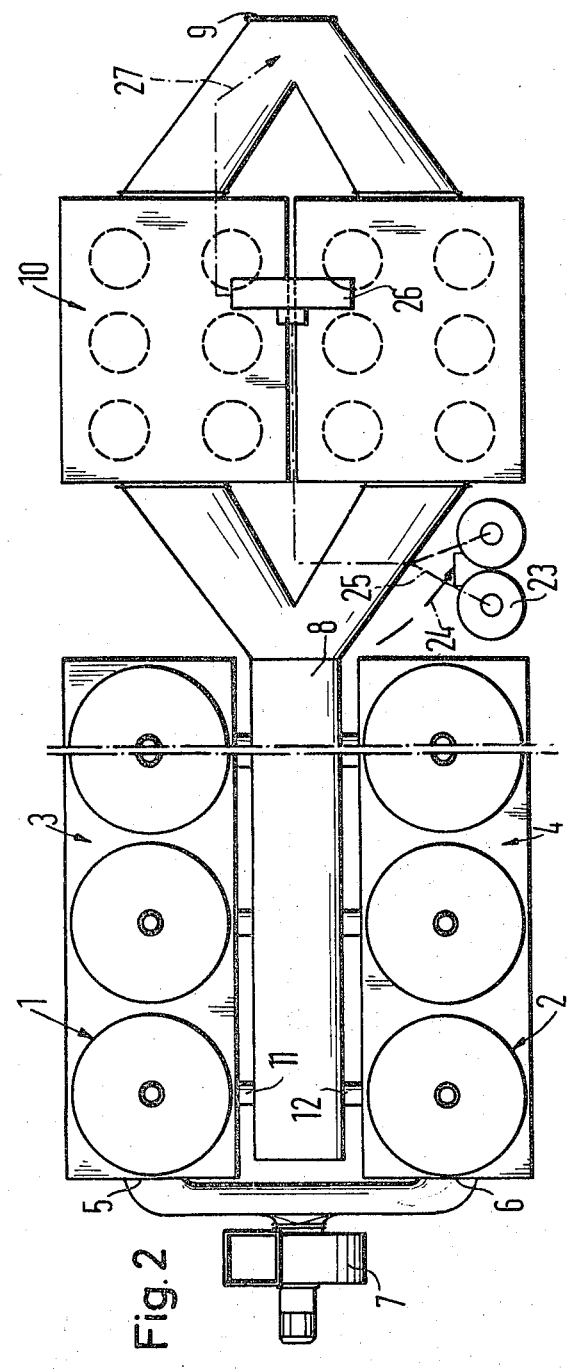

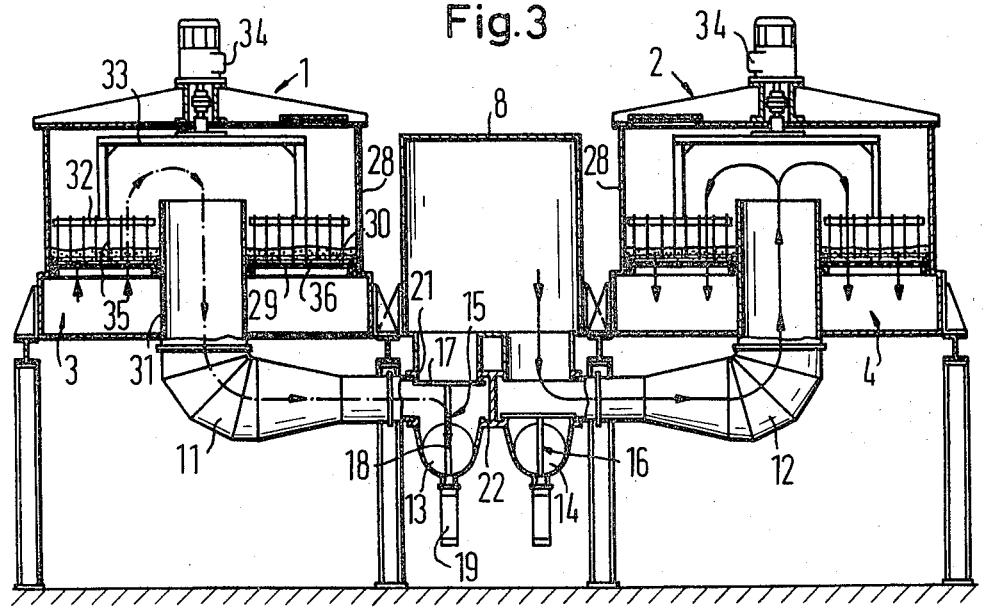
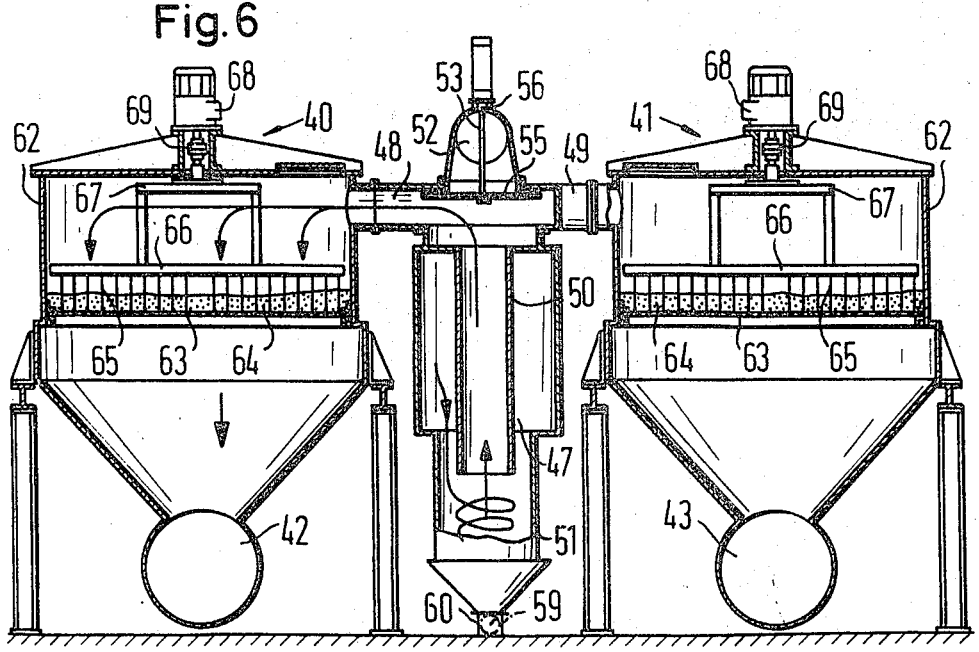

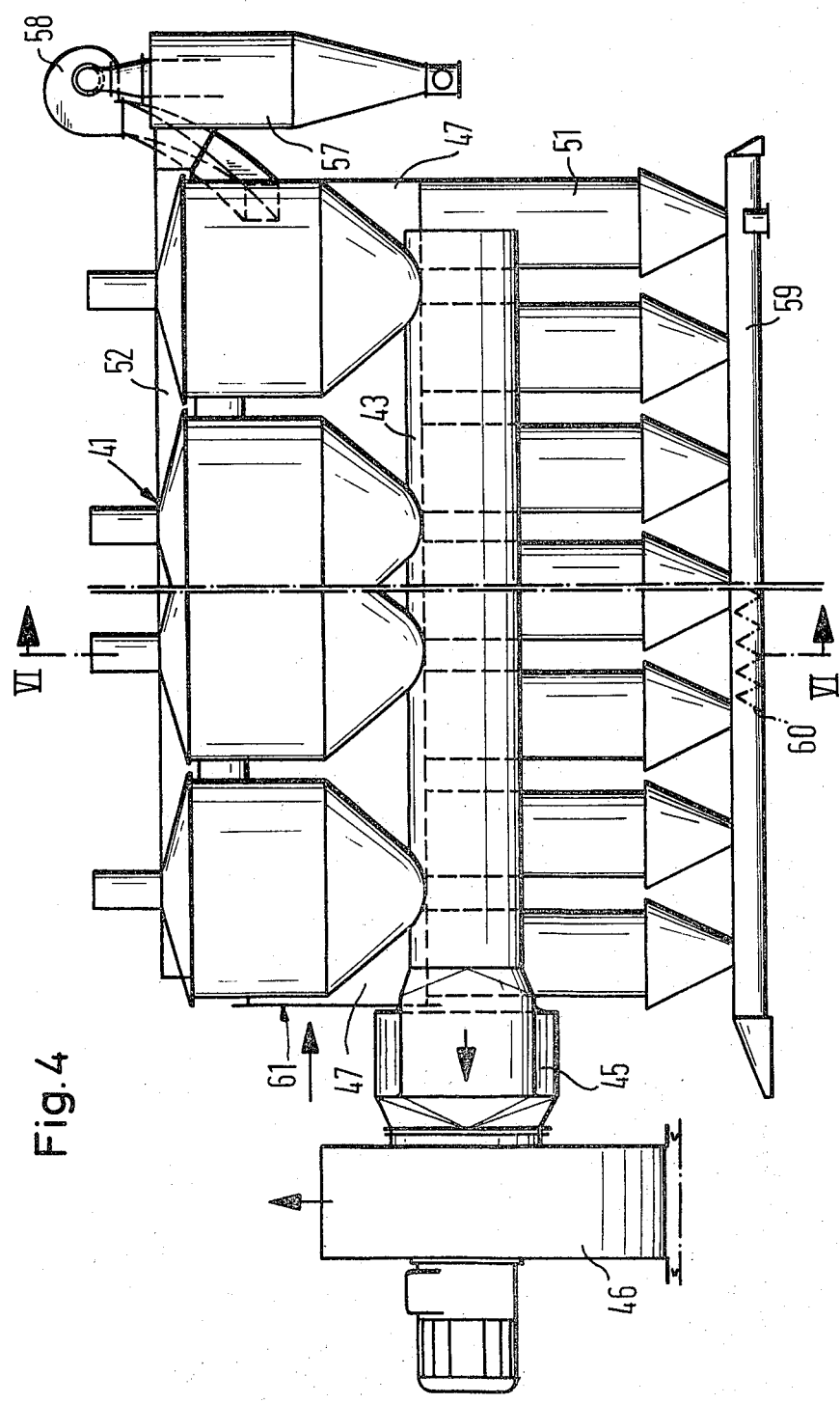

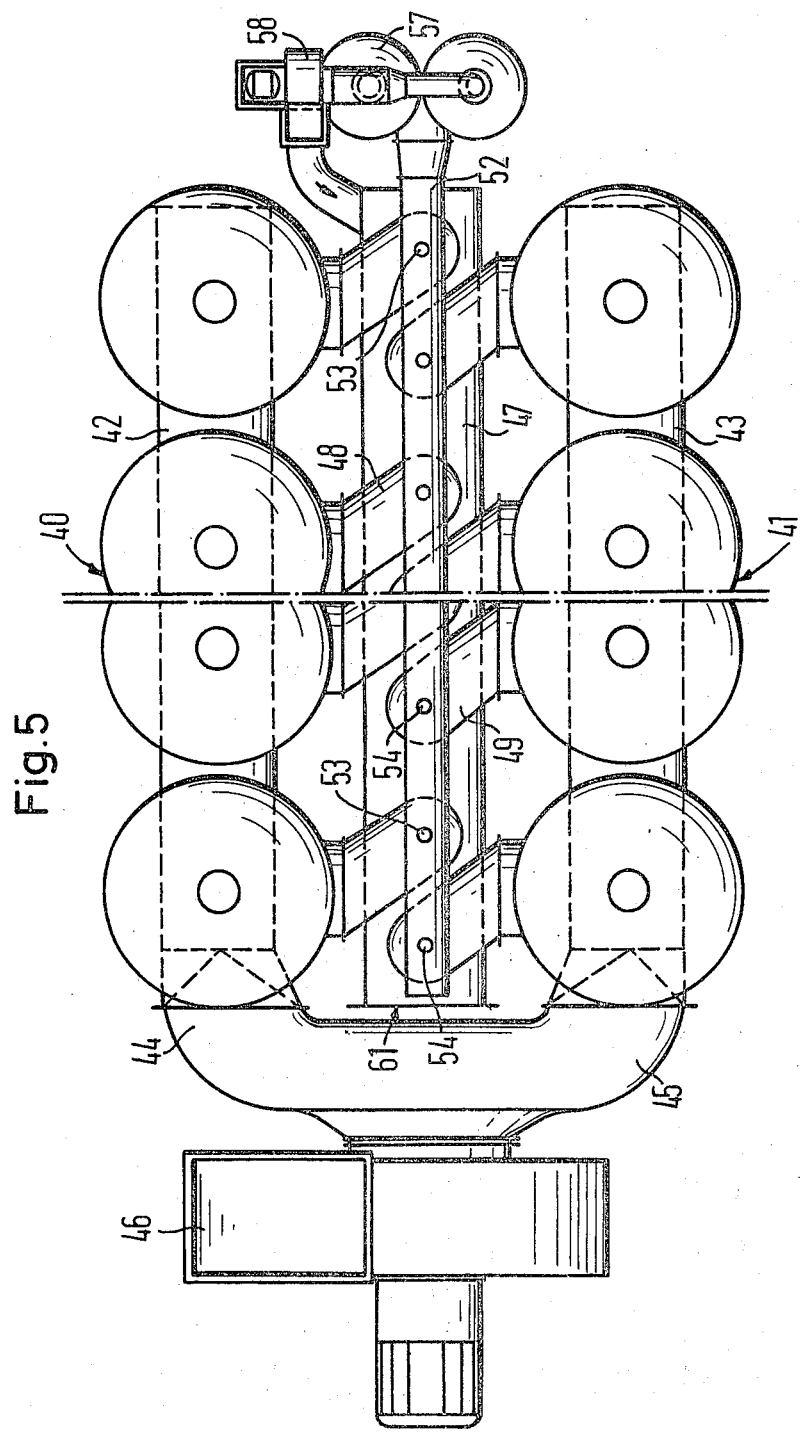

DUST FILTER ARRANGEMENT

This is a continuation of application Ser. No. 208,269, filed Dec. 15, 1971, now abandoned, which itself is a continuation-in-part of abandoned application Ser. No. 143,130, filed on May 13, 1971, itself a continuation-in-part of application Ser. No. 777,454, filed on November 20, 1968, and now U.S. Pat. No. 3,594,991, which in turn is a continuation-in-part of the abandoned application Ser. No. 491,670, filed on Sept. 30, 1965.

It is common practice to purify process gases in chemical plants and like installations by separating suspended coarse solid particles from the gaseous carrier by centrifugal forces and by thereafter removing fine particles when the gas stream is passed through a filter bed of granular material, as disclosed, for example, in our earlier U.S. Pat. No. 3,594,991, issued on July 27, 1971.

An object of the invention is the provision of a purification plant of the type described, hereinafter referred to as a filter arrangement, which is capable of operating continuously at uniformly high effectiveness, yet requires relatively little space.

Another object is the provision of a filter arrangement in which individual filtering units can be regenerated effectively and without consuming much energy.

A further object is a method of operating the filter arrangement at highest efficiency.

With these objects and others in view, as will hereinafter become apparent, the invention, in one of its more specific aspects, resides in a filter arrangement in which each of a plurality of filter chambers is provided with a foraminous support and a filter bed of granular material on each support, the support and the filter bed constituting a gas-permeable, dust-retaining wall which vertically separates first and second compartments in the chamber. A purified-gas manifold communicates permanently with each first compartment, and valves alternatively connect each second compartment with a raw gas intake and with a scavenging gas discharge conduit. A preliminary separator in the intake removes suspended coarse particles from the raw gas admitted to the intake, and another separator in the scavenging gas discharge conduit separates solid particles from the scavenging gas which flows outward of the sedond compartments. A circulating fan is connected by its suction port to the scavenging gas discharge conduit and by its pressure port to the raw gas intake, and an exhaust fan draws raw gas into the intake and discharges purified gas from the afore-mentioned manifold.

In another aspect, the invention resides in a method which may be performed in the afore-described filter arrangement in which a stream of raw gas having solid particles suspended therein is separated in a preliminary separating zone from coarse solid particles having a size of more than 50 microns. The stream substantially free from the coarse particles is divided into a plurality of branches, and the branches are passed through respective filter beds of a group of filter beds while maintaining the same pressure differential across each of the filter beds. Fine solid particles having a size of less than 50 microns are retained from the branch streams in the respective filter beds. The purified branches are combined, and a portion of the combined branch streams is passed as a scavenger gas through another filter bed retaining particles of a size of less than 50 microns in a direction to dislodge the particles and to entrain the same in the scavenger gas. The entrained particles are partly separated from the scavenger gas, and the scavenger gas partly separated from the entrained particles is admixed to the raw gas prior to the separating of the raw gas from the afore-mentioned coarse particles. The amount of particles retained by the filter beds must be sufficient to make the content of the fine particles in the combined branch streams not more than 13 percent by volume of the fine particles entrained in the scavenger gas. Thereafter, one of the branch streams substantially free from the coarse particles is passed through the scavenged other filter bed, while the scavenger gas is passed through the filter bed of the group of filter beds which was previously passed by the last mentioned one branch stream.

Other features, additional objects, and many of the attendant advantages of this invention will readily be appreciated as the same becomes better understood by reference to the following description of preferred embodiments when considered in connection with the appended drawing in which:

FIG. 1 shows a filter arrangement of the invention in side elevation and partly by conventional symbols;

FIG. 2 illustrates the apparatus of FIG. 1 in top plan view;

FIG. 3 is an elevational section of the same apparatus taken on the line III — III in FIG. 1;

FIG. 4 shows another filter arrangement of the invention in fragmentary side elevation;

FIG. 5 illustrates the apparatus of FIG. 4 in top plan view;

FIG. 6 is a sectional view taken on the line VI — VI in FIG. 4;

Figure 7:
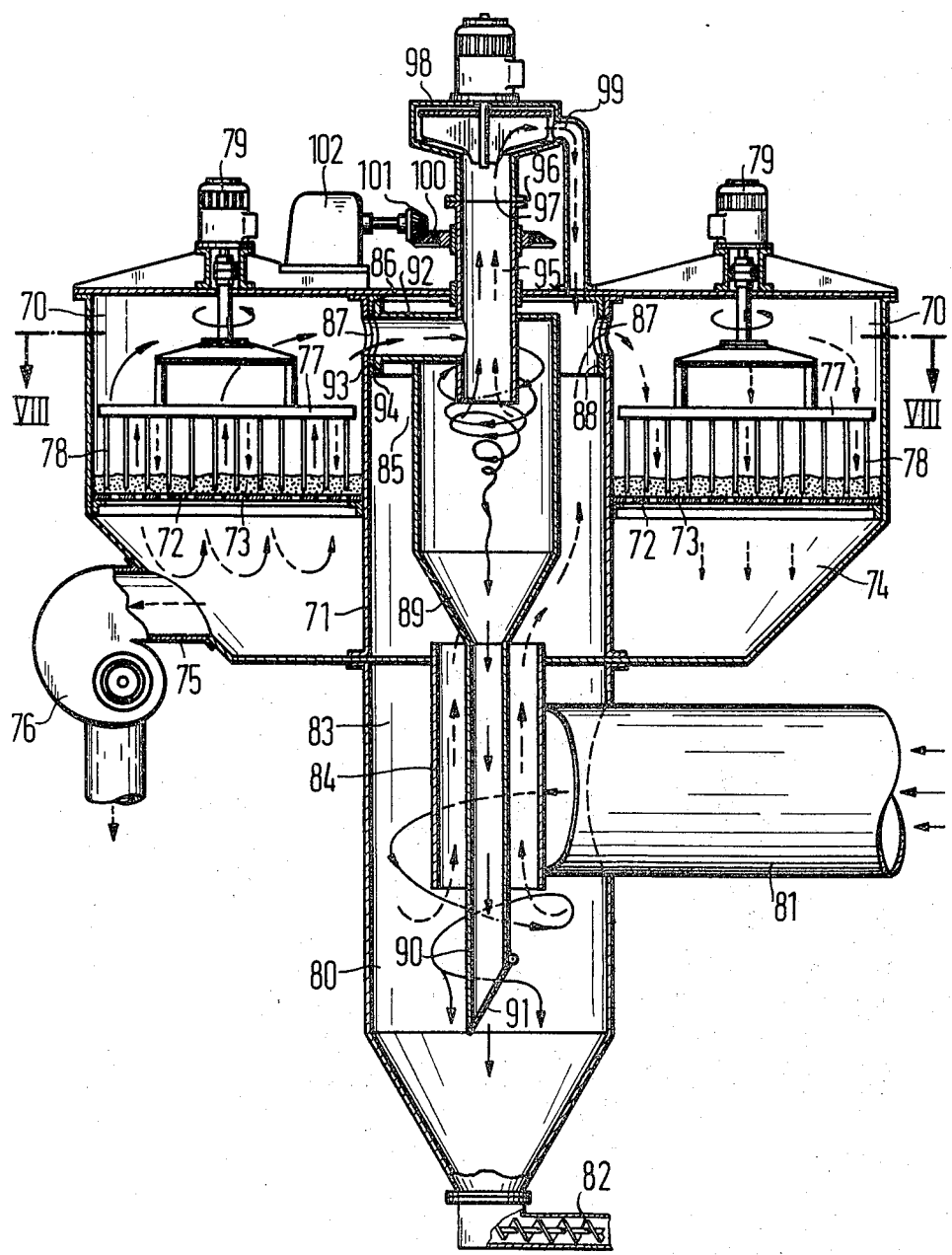
FIG. 7 shows yet another filter arrangement of the invention in elevational section on the line VII — VII in FIG. 8.

Referring now to the drawing in detail, and initially to FIGS. 1 and 2, there are shown two straight rows 1,2 of filter chambers mounted on respective trough-shaped manifolds 3,4. The two intake ports 5,6 of an exhaust fan 7 are permanently connected with the manifolds 3,4. A manifold portion 8 of a raw gas intake is arranged between the two rows 1,2 and receives raw gas carrying solid particles from nonillustrated process equipment to which it is normally attached by a flange 9. Two batteries of preliminary cyclone separators 10 are arranged in parallel between the flange 9 and the manifold portion 8.

As is better seen in FIG. 3, branch conduits 11, 12 from the filter chambers of the rows 1,2 may be connected alternatively to the manifold portion 8 of the raw gas intake and to respective scavenging gas discharge conduits 13,14 common to the filter chambers of the two rows by valves 15,16 associated with each filter chamber. Each valve 15,16 has a disc 17 mounted on the piston rod 18 of a reciprocating hydraulic or pneumatic jack 19 which moves the disc 17 between a valve seat 21 on the manifold portion 8 and a valve seat 22 on the corresponding discharge conduit 13,14.

Reverting to FIGS. 1 and 2, there is seen a connecting tube 24, represented by a broken line in order not to crowd the drawing, which connects the two discharge conduits 13,14 to the intake openings of two dust separator cyclones 23. A similarly represented suction line 25 of a circulating fan 26 draws scavenging gas from the conduits 13,14, and the pressure port of the fan 26 is connected to the raw gas intake closely adjacent the flange 9 by a pressure tube 27.

The individual filter chambers of the rows 1,2 are identical and best seen in FIG. 3. Each filter chamber has a cylindrical shell 28 mounted over a corresponding opening in the top wall of the associated manifold 3,4. A flat, annular, foraminous plate 29 of sheet metal carries a filter bed 30 of pebbles or similar granular material, and the sheet 29 and bed 30 jointly constitute a horizontal wall which vertically separates an upper compartment in the shell 28 from a lower compartment wide open toward the manifold 3,4. The wall 29, 30 is permeable to gas flow between the compartments while retaining dust from downwardly flowing gas. A wide, upright tube 31 coaxial with the shell 28 and passing through the wall 29,30 in sealing engagement connects the upper compartment with the branch conduit 11,12.

Two rakes 32 are mounted on a support bar 33 in a common vertical plane through the axis of the shell 28 in the upper compartment on either side of the tube 31, and may be rotated about the axis by an electric motor 34 mounted on the cover of the shell 28. The output shaft of the motor passes through a seal in the cover and is attached to the support bar 33. The tines 35 of the rakes 32 pass downward through the exposed upper surface of the filter bed 30 and their free ends are located closely adjacent the foraminous sheet 29, the distance between the tines 35 and the sheet 29 being not more than one inch. The tines of each rake are connected horizontally by a wire 36 located in the lower third of the filter bed 29.

During normal operation of the dust filter arrangement shown in FIGS. 1 - 3, the fans 7 and 26 are driven continuously while the pneumatic or hydraulic jacks 19 of the several filter chambers are operated sequentially by means of solenoid valves in their non-illustrated power fluid circuits, and by a timing switch in the electrical circuit of the solenoid valves which also controls the motors 34 for rotating the rakes 32 whenever the associated valve discs 17 engage the valve seats 21, the electric control system being conventional in itself and not shown. The timing switch is set to shift each valve disc 17 from the position seen in the valve 16 to that of the valve 15 after a period of not less than 20 minutes and to return it to the position of the valve 16 after a shorter, adjustable period.

The valve 16 causes the suction of the exhaust fan 7 applied through the manifold 4 to the underside of he wall 29,30 to draw raw gas stripped of coarse particles in the preliminary separator cyclones 10 through the filter bed 30 on which fine dust particles are retained, while the purified gas is discharged from the apparatus through the exhaust fan 7.

The valve 15 connects the upper compartment of a filter chamber through the branch conduit 11 and the scavenging gas conduit 13 to the cyclone separators 23 and the intake port of the circulating fan 26. The suction of the fan 26 is sufficient to draw purified gas from the manifold 3 against the suction of the fan 7 upward through the filter bed 30 of the associated chamber while the motor 34 turns the rakes 32. The upward gas stream entrains the dust particles accumulated on the pebbles of the bed 29 during a preceding filtering operation and dislocated by the tines 35 and the wires 36, and the dust-laden scavenging gas is drawn through the separators 23 which retain most of its suspended solids, the scavenging gas and residual solids therein being mixed with the raw gas entering the system through the flange 9.

In the filter arrangement illustrated in FIGS. 4 to 6, two straight rows of filter chambers 40,41 are connected by respective purified-gas manifolds 42,43 located below the conical lower compartments of the filter chambers. The manifolds are connected to the two intake ports 44,45 of an exhaust blower 46. The raw-gas intake of the filter arrangement has a manifold portion 47 connected with the upper compartments of filter chambers 40,41 by horizontal branch conduits 48,49 during the filtering phase, the manifold 47 being arranged between the two rows of chambers 40,41.

Each branch conduit 48,49 may be connected to a vertical tube 50 which passes downward through the manifold 47 and coaxially into a cyclone separator 51 into which a branch stream of the raw gas is admitted from the manifold 47 through an annular gap about the tube 50. The connection between each branch conduit 48,49 and the associated tube 50 may be closed by a valve 53, 54 whose valve disc 55 may be moved from the position shown in FIG. 6 to a valve seat at the orifice of the tube 50 by a pressure-fluid operated motor 56, thereby connecting the associated filter chamber with a scavenging-gas discharging conduit 52 common to all chambers 41, 42. The conduit 52 leads to two cyclone-type, centrifugal separators 57 from which the scavenging gas, partly stripped of solid particles, is returned by a circulating fan 58 to the end of the manifold 47 remote from the flange 61 which connects the manifold to the source of raw gas, now shown.

As is shown in FIGS. 4 and 5, a preliminary separator 51 is associated with each filter chamber 40,41 to strip coarse particles from a branch stream of the raw gas, and all separators 51 discharge the collected particles by gravity into a connecting tubular casing 59 enveloping a conveying screw 59. Solid particles are similarly removed from the separators 57 in a manner not explicitly shown.

The flow of gas through a filter chamber 40 during the filtering stage is indicated by arrows in FIG. 6. The indicated helical flow pattern in the separator 51 is brought about by suitably inclined, non-illustrated baffles in the annular gap between the tube 50 and the outer cylindrical wall of the separator 51.

Each filter chamber is divided into an upper and a lower compartment by a gas-permeable wall constituted by a horizontal, perforated sheet 63 and a filter bed 64 of pebbles, cement clinkers classified to a uniform size, or the like, arranged on the sheet 63. In the absence of a central, vertical feed tube for the gas to be purified, the filter layer 64 is agitated during the regeneration phase by the tines 65 of a single rake 66 extending across the diameter of the cylindrical shell 62 which bounds the upper compartment of the filter chamber. The tines 65 are long enough to touch the sheet 63, and their free ends are preferably made of wear resistant synthetic rubber.

The rake 66 is suspended from an overhead support 67 secured to the output shaft of an electric drive motor 68 by an axially yieldable coupling 69 to permit limited axial movement of the tines 65 as they encounter immovable obstacles such as pebbles or clinkers wedged in perforations of the sheet 63.

The tines 35,65 shown in FIGS. 3 and 6 may be tubular, and may be connected with a source of gas under pressure in a manner known in itself so that the gas may be discharged into the filter beds 30,64 during regeneration of the latter and assist in blowing accumulated dust particles from the heavier granular material of the filter bed.

If so desired, the exhaust fans or blowers 7,46 arranged at the discharge end of the filter arrangements described above may be replaced by blowers mounted on the flanges 9,61 to force crude gas under pressure into the intake of each filter arrangement. Such a modification makes it possible to employ circulating fans 26,58 equipped with relatively weak motors.

Figure 8:
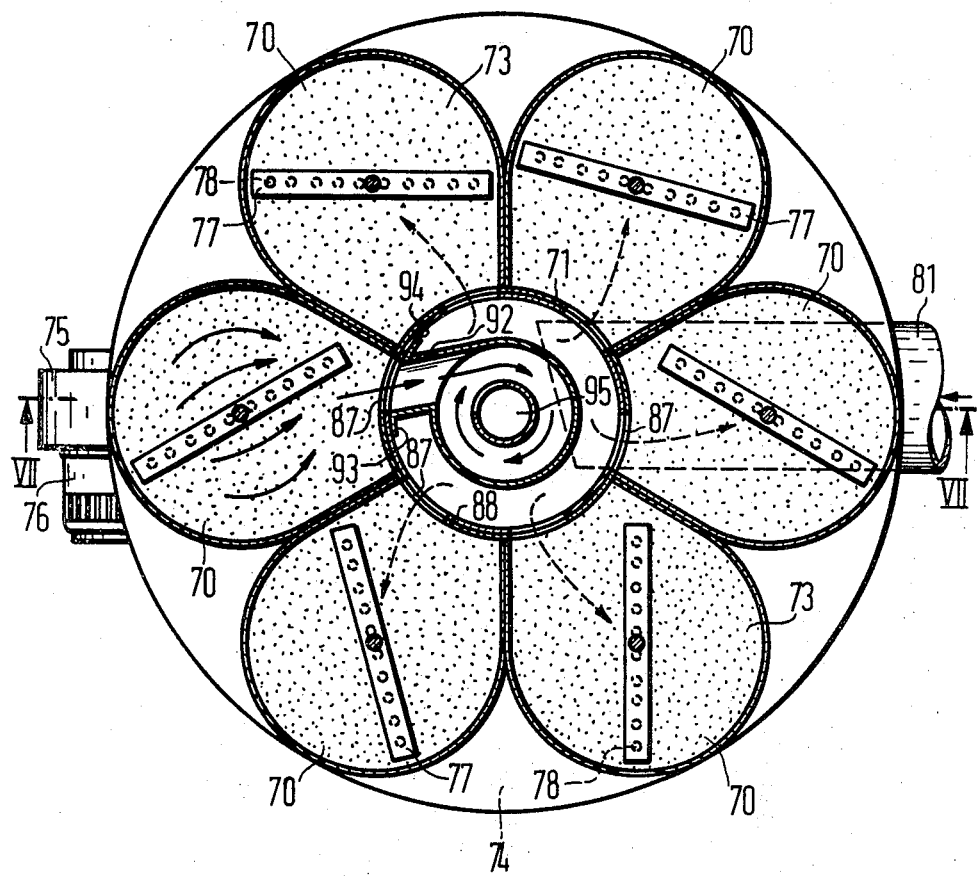
FIG. 8 is a plan section of the apparatus of FIG. 7 on the line VIII — VIII.

In the dust filter arrangement of the invention illustrated in FIGS. 7 and 8, six filter chambers 70 are equiangularly clustered about a central, upright shaft 71 which is of circular cross section. The upright walls of the upper compartments in the chambers 70 are cylindrically curved over more than 180° of their circumference, and these compartments are each bounded downwardly by a perforated, horizontal metal sheet 72 carrying a filter bed 73 of granular material whose particles are many times heavier than the dust particles they are expected to retain from a gas stream to be purified.

The lower compartment of each filter chamber 70 is open to a common manifold 74 which is annular about the central shaft 71 and connected with an exhaust blower 76 by a duct 75. A rake 77 in each chamber 70 has tines 78 which enter the filter bed 73 through its exposed upper surface and extend close to the sheet 72. Each rake 77 may be turned about the axis of curvature of the associated cylindrically arcuate compartment wall by an electric drive motor 79 mounted on the top cover of the compartment.

The generally cylindrical shaft 71 is divided by a horizontal partition 83 into two axial sections. The lower section 80 has a conically tapering bottom leading to a screw conveyor 82 and receives raw gas through an intake pipe 81 leading into the section 80 in a direction tangential relative to a circle about the axis of the shaft 71. The section 80 thus functions as a preliminary separator which strips coarse particles from the raw gas. A coaxial, wide tube 84 passes from the section 80 through the partition 83 into the upper section 85 of the shaft 71 which is upwardly sealed by a flat cover 86.

Radial openings 87 equiangularly spaced in the circumferential wall of the shaft section 85 adjacent the cover 86 extend also through a cylindrical ring 88 which reinforces the apertured wall portion and is made of self-lubricating material, such as sintered powder metal containing graphite or plastic, and at least five of the six openings 87 simultaneously connect the section 85 with respective filter chambers 70. The sixth opening 87 is connected with a cyclonetype separator 89 coaxially centered in the section 85 by an exhaust duct 92 for scavenging gas having a terminal flange 93 which sealingly engages the ring 88 at 94. Solids separated from the scavenging gas by centrifugal forces in the separator 89 drop into a long and relatively narrow, vertical tube 90, coaxially received in radially spaced relationship in the wide tube 84. The bottom end of the tube 90 is cut off at a small acute angle to its axis and provided with a valve flap 91.

The central gas discharge pipe 95 of the separator 89 passes from an orifice well below the duct 92 through a seal in the cover 86, and its upper end is movably sealed by flanges 96 to the suction port 97 of a circulating fan 98. The pressure port 99 of the fan 98 is connected with the shaft section 85. A bevel gear 100 mounted coaxially on the discharge pipe 95 above the cover 86 meshes with a pinion 101 on the output shaft of an electric drive motor 102.

The apparatus shown in FIGS. 7 and 8 operates as follows:

The fan 76 is continuously driven, the electric motors 79, 102 are energized by a timing switch (not shown), and the fan 98 is driven whenever one of the motors 79 operates and the motor 102 stands still. Five of the six filter chambers 70 are simultaneously operated by the exhaust fan 76 which draws contaminated gas into the intake pipe 81, separates coarse particles from the gas in the preliminary separator 80, thereafter draws the gas through the tube 84, the shaft section 85, the openings 87, and the filter beds 73 into the purified-gas manifold 74 for discharge from the filter arrangement substantially free from solid particles. The associated motors 79 stand still.

The sixth filter chamber 70 is simultaneously being regenerated while its opening 87 is aligned with the exhaust duct 92. The circulating fan 98 draws purified gas from the manifold 74 upward through the filter bed 73 while the same is being agitated by the rotating rake 77 and by gas discharged from the tines 78 in a manner described above and not illustrated. The scavenging gas and the dust particles dislodged from the filter bed 73 and suspended in the scavenging gas are largely separated from each other in the separator 89 while the valve flap 91 is held closed by the pressure differential between the tube 90 and the shaft section 80.

The scavenging gas, stripped of much of its solid content, is mixed with the raw gas in the shaft section 85. While the pipe 95 is being turned 60° by the motor 102 after regeneration of one filter chamber, the fan 98 is briefly stopped, and the valve flap 91 drops under its own weight and that of the dust particles accumulated in the pipe 90 to let the particles drop into the screw conveyor 82. The next filter chamber is regenerated after its opening 87 is aligned with the duct 92 and the motor 102 is stopped, the flow section of the duct 92 being at least equal to that of each opening 87.

A baffle, not shown, is preferably located in the shaft section 85 to direct the gas discharged from the circulating fan 98 tangentially into the shaft section 85, and thereby to enhance the tangential component of the gas stream entering each filter chamber 70 through an opening 87 while the chamber is in its filtering phase.

Figure 9:
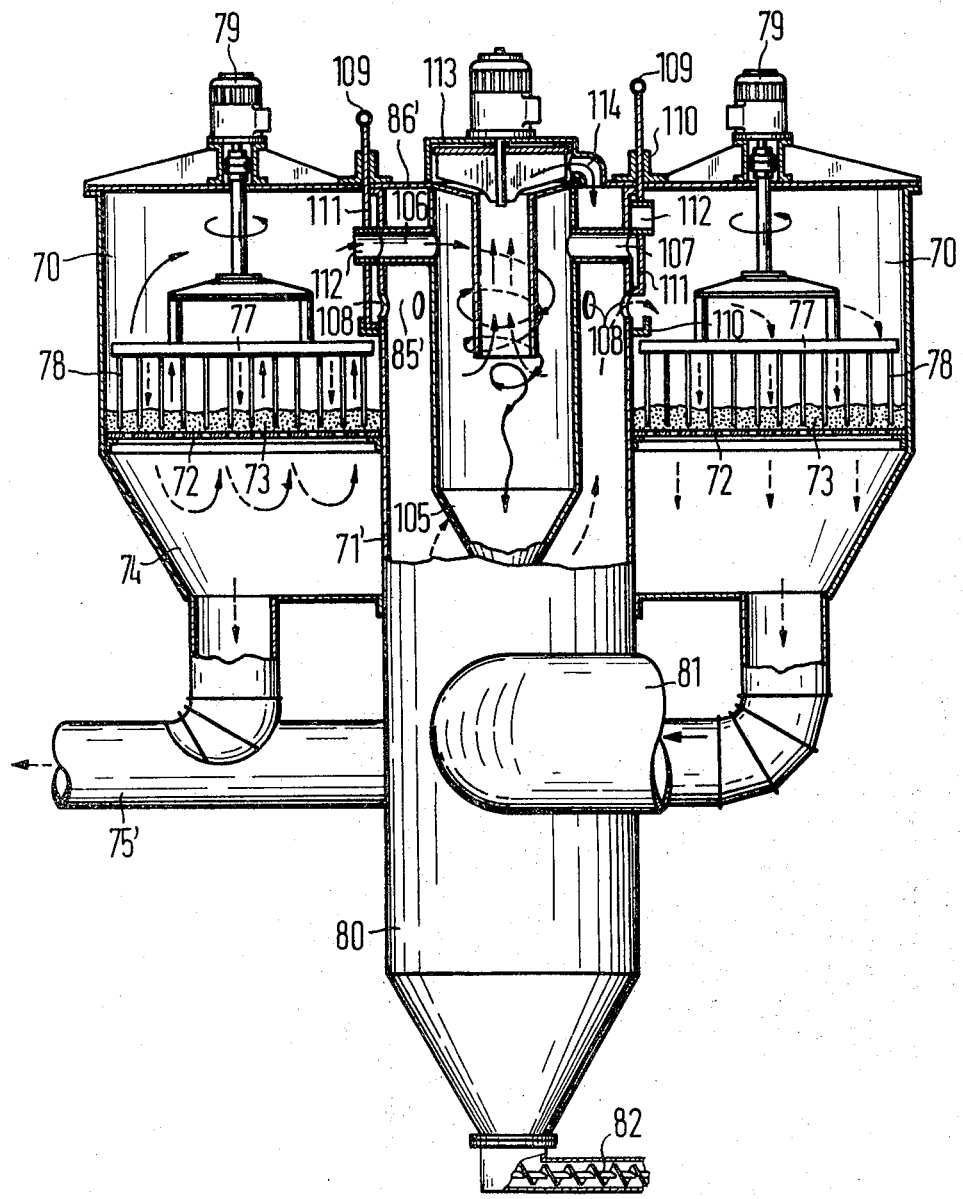
FIG. 9 shows a modification of the apparatus of FIG. 7 in a corresponding view.

The apparatus shown in FIG. 9 is identical in many of its components with the corresponding elements illustrated in FIGS. 7 and 8, and the unchanged elements have been provided with the same reference numerals. They include the several filter chambers 70 and the devices arranged in the same. Instead of a single exhaust duct 75, a branched exhaust duct 75' connects the annular manifold 74 with the exhaust blower 76 not itself seen in FIG. 9. The central shaft 71' has a lower section 80 identical with the corresponding section of the afore-described shaft 71 and receiving raw gas through an intake pipe 81.

The cover 86' of the modified upper shaft section 85' is provided with a fixedly mounted, coaxial, cyclone separator 105. A scavenging gas exhaust duct 106 tangentially enters the separator 105 near its upper end from each of six equiangularly spaced openings 107 on a common axial level of the shaft section 85' leading into respective filter chambers 70. Another opening 108 is downwardly spaced a small distance from each opening 107, and a valve operating element 109 extends upward from each filter chamber through a guiding seal 110. Each element 109 is attached to a valve slide 111 including a short tubular passage 112, and permits the slide 111 to be shifted between the two positions illustrated in FIG. 9. In one position of the slide, the passage 112 is aligned with the opening 107 for discharge of scavenging gas from the filter chamber, and the corresponding opening 108 is sealed. In the other position, the opening 107 is sealed, and the corresponding opening 108 permits free flow of gas stripped of its heavy solid particles from the shaft section 85' into a filter chamber 70.

A circulating fan 113 mounted on the cover 86' has an intake port directly communicating with the central gas discharge tube of the separator 105, and a pressure port 114 leading back into the upper shaft section 85' for mixing the scavenging gas partly stripped of solid particles with the raw gas supplied by the intake pipe 81 and stripped of coarse particles in the lower shaft section 80 as described above. All centrifugally separated particles are discharged through the screw conveyor 82 as described with reference to FIGS. 7 and 8.

The valve operating elements 109 may be shifted manually if so desired to change the mode of operation of the filter chambers in any desired sequence, but actuators operated by electric current or a pressure fluid may be connected with the operating elements 109 in a conventional manner and controlled in timed sequence to regenerate one filter chamber at a time while the other five are in the filtering phase of operation. The apparatus of FIG. 9, however, may also be operated in a cycle in which two chambers are being regenerated while the other four are being used for filtering raw gas. Continuous operation with constant performance is thus possible with raw gases carrying an unusually heavy amount of solids which requires frequent regeneration of the filter beds.

Rakes equipped with tines which may be hollow and discharge scavenging gas have been found useful with relatively thin filter beds. Agitating equipment more advantageous for relatively deep filter beds suitable for removing very small dust particles from a gas stream is illustrated in FIGS. 10 to 13. Only as much of a filter chamber is shown in these Figures as is necessary for an understanding of the agitating equipment, and it will be appreciated that each of the filter chambers described hereinabove may be equipped with the devices shown in FIGS. 10 to 13.

Figure 10:
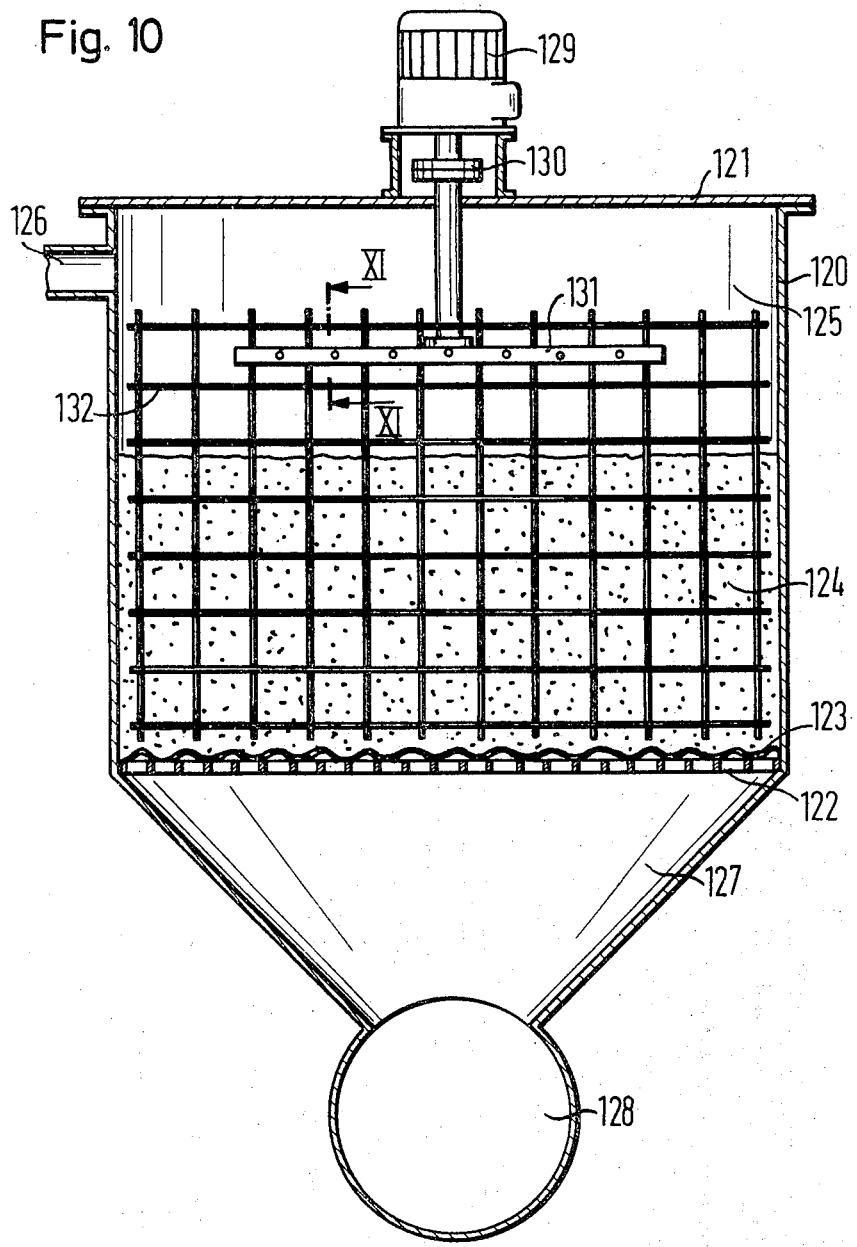
FIG. 10 shows a modified detail for the filter chambers in any one of the devices of FIGS. 4, 7, and 9 in elevational section.

FIG. 10 shows the upper compartment 125 of a filter chamber bounded by a cylindrical circumferential shell 120, a flat cover 121, and a bottom constituted by a grid 122 of flat steel bars covered by a corrugated sheet screen 123 supporting a filter bed 124 of granular material having a particle size greater than the size of the openings in the screen 123. During the filtering phase, raw gas enters the compartment 125 through a duct 126, and scavenging gas is released through the same duct during regeneration of the filter bed 124 when purified gas passes from a manifold 128 and the lower compartment 127 of the filter chamber upward through the filter bed 124 in a manner obvious from the descriptions of FIGS. 1 to 9.

A motor 129 mounted on the cover 121 is coupled by flanges 130 to a horizontal carrier arm 131 for rotating the arm about the vertical axis of rotation of the motor. A wide-meshed screen of rectangularly intersecting wires 132 welded to each other at their intersections is attached to the carrier arm 131 in a manner best seen in FIG. 11. The arm 131 consists of angle iron whose web is vertical and apertured, the spacing of the apertures being equal to the length of the square openings in the wire screen. The upright wires 132 of the screen are clamped between the web of the arm 131 and a flat steel bar 133 by bolts 134 passing through the apertures in the web and aligned apertures in the bar 133, and each secured by a spring washer 135 and a nut 136.

The wires 132 are made of spring steel, are round and of uniform diameter. The horizontally arranged wires project beyond the last vertical wires of the screen in both directions. The vertical wires project downward beyond the lowermost horizontal wires to produce the raking effect of the tines described above. The diameters of the wires are chosen equal or at least closely similar to the average diameter of the granular particles in the filter bed 124. The vertical position of the screen on the carrier arm 131 can be adjusted by loosening the nuts 136, setting the desired level of the screen, and again tightening the nuts.

Figure 11:
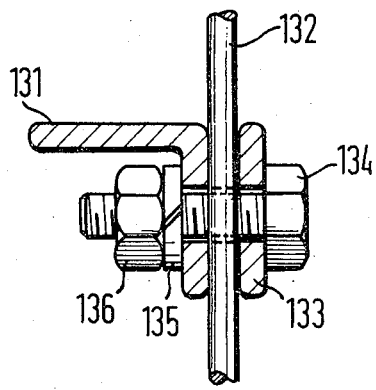
FIG. 11 illustrates a detail of the apparatus of FIG. 10 in enlarged section on the line XI — XI.

The wire screen shown in FIGS. 10 and 11 has been found to be capable of rotating in a filter bed of granular material such as pebbles or cement clinkers screened to a uniform size when driven by a motor of surprisingly little power, yet to produce a loosening effect on deposited dust particles at least equal to that of rakes and tines of much heavier cross section and requiring much greater force for movement through a filter bed.

If so desired, more than one carrier arm 131 and more than one screen of wires 132 may be mounted on a common drive motor in the same filter bed 124, the arms 131 and screens intersecting each other in the axis of rotation.

Figure 12:
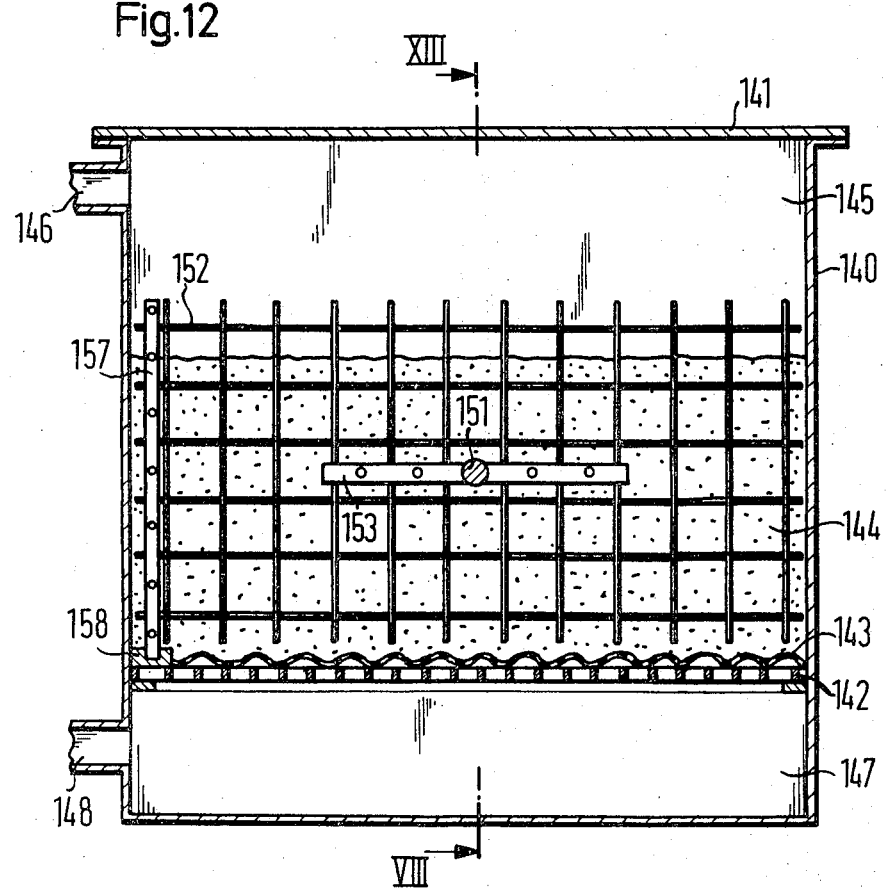
FIG. 12 shows a modification of the apparatus of FIG. 10 in front elevational section.
Figure 13:
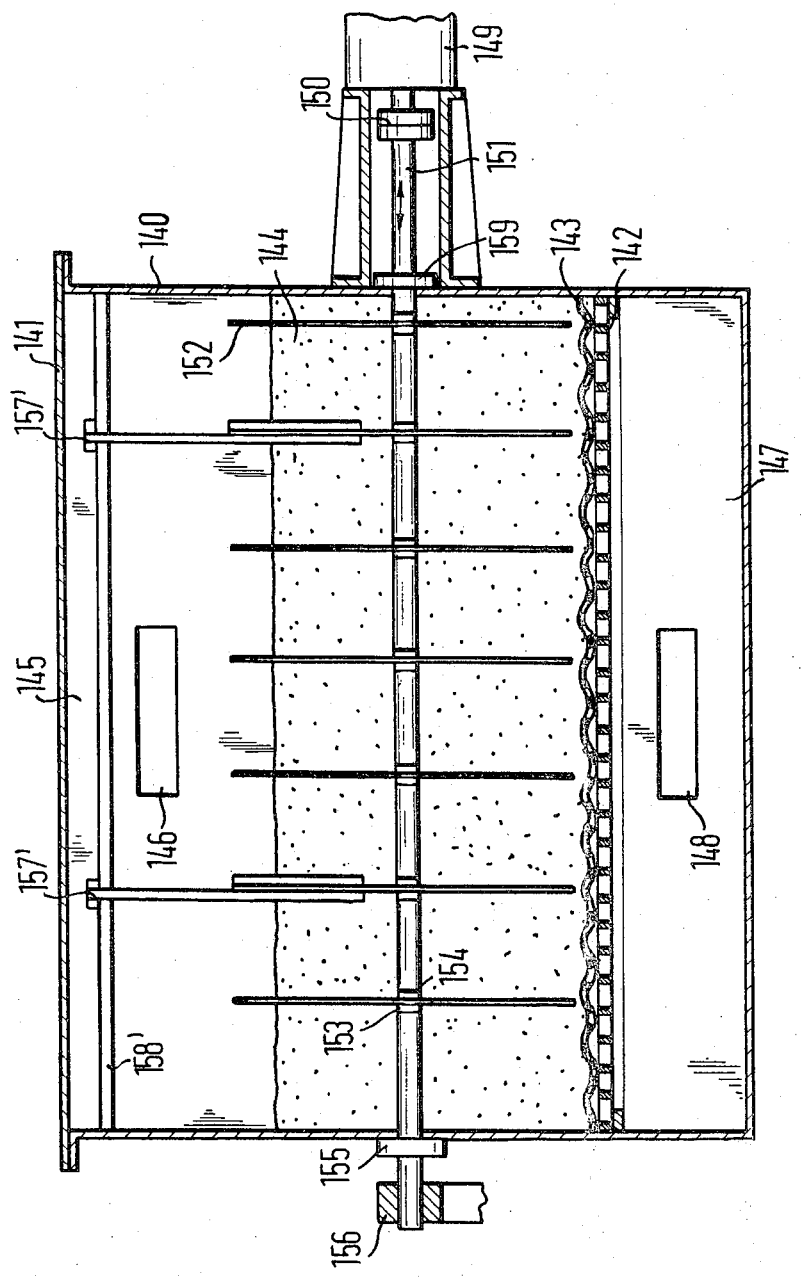
FIG. 13 is a side elevational section of the device of FIG. 12.

Analogous results are achieved with horizontally reciprocating wire screens closely similar to that shown in FIGS. 10 and 11, and a system of such screens is seen in FIGS. 12 and 13.

The filter chamber shown in FIGS. 12 and 13 has an upright shell 140 of rectangular cross section, a cover 141 and a grid 142 of intersecting flat steel bars which upwardly bounds a lower compartment 147 of the chamber. The grid 142 carries a corrugated, perforated metal sheet 143 and a layer of particulate filter material 144 supported on the sheet 143. The upper compartment 145 may be connected to a raw gas intake or to a scavenging gas discharge conduit, not themselves seen, through a duct 146 and a non-illustrated two-way valve, and a duct 148 permanently connects the lower compartment 147 to a non-illustrated manifold for purified gas, as described above.

The cylinder 149 of a reciprocating pneumatic motor is mounted on the upright shell 140 and a rod 151 is connected to the piston rod of the pneumatic motor by a coupling 150 in longitudinally aligned relationship. The valve which admits compressed air to the cylinder 149 and releases the air to cause reciprocating movement of the piston and of the rod 151 has not been shown since it may be entirely conventional. The rod 151 enters the filter chamber through a packing 159 on the upright shell 140 near the motor 149 and passes outward of the chamber through another portion of the shell 140 provided with a packing 155. The end of the rod 151 far from the motor 149 is slidably received in a stationary bearing 156.

The rod 151 is located below the surface of the filter bed 144 and approximately at mid-height of the bed. It carries seven wire screens 152 perpendicular to the longitudinal direction of rod movement and approximately uniformly spaced from each other a distance equal to the stroke of the rod 151. They are attached to the rod 151 by transverse arms 153 of angle iron and flat bars 154 substantially as shown in FIG. 11. An upright guide pin 157 consisting of two flat pins connected by screws to clamp the horizontal wires of the screen is arranged near an upright edge of each screen 152, and the lower end of the pin 157 is movably received in a horizontal guide rail 158 mounted on the grid 142.

Additional guidance for the wire screens 152 is provided by a guide rail 158' parallel to the rod 151 and arranged well above the surface of the filter bed 144. Two guide pins 157', each consisting of two flat steel bars and screws clamping the bars to a screen 152 in the manner evident from FIG. 11, slide along the rail 158' when the motor 149 is operated. The pins 157' and the rail 158' have been omitted from FIG. 12 for the sake of clarity.

Figure 14:
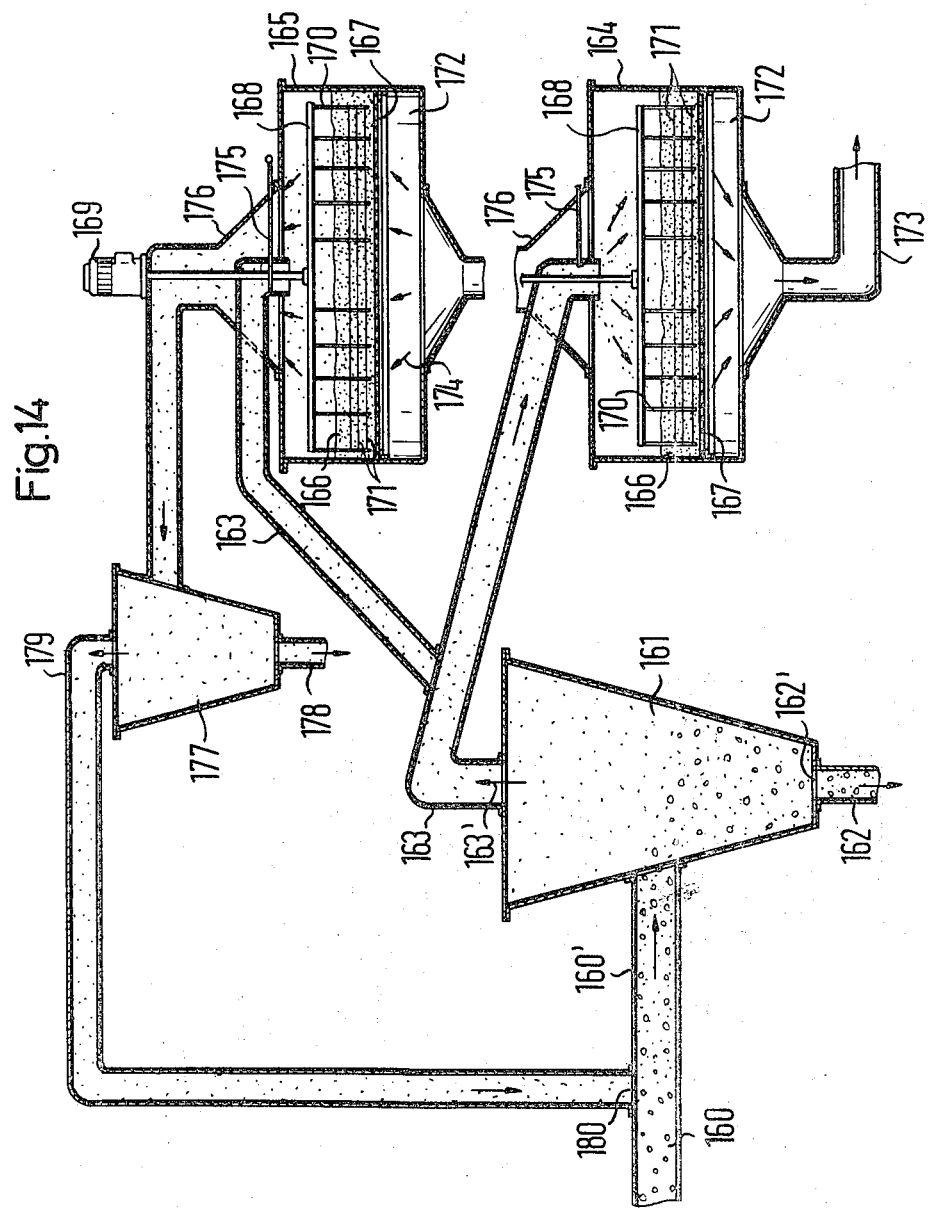
FIG. 14 is a flow diagram of elements common to several embodiments of the invention illustrating their mode of operation.

The basic mode of operation which permits the several dust filter arrangements of the invention to operate continuously with uniform efficiency is illustrated by the flow sheet of FIG. 14, and the correlation of the flow sheet with the several specifically illustrated and described embodiments will be evident.

An intake 160 receives a raw gas 160' in which both coarse and fine particles of solid matter, herein referred to as "dust," are suspended, the coarse particles having a size of 50 microns or greater, and the fine particles having a size of less than 50 microns. The raw gas is first led to a preliminary separator 161 which presents to the gas flow an aerodynamic resistance of 40 ± 15 mm water column and causes at least 90 percent of the coarse particles 162' to separate from the gas and to be discharged through a duct 162. The gas still carrying fine dust particles is fed through a manifold 163 to a filter chamber 164 and is passed downward through a filter bed 166 of particulate or granular material supported on a perforated sheet or bottom 167 to a lower compartment 172, while the fine particles are retained in the filter bed 166. The purified gas is discharged through a manifold 173 by means of a blower or fan which may be located ahead of the intake 160 or behind the manifold 173 in the direction of gas flow.

The material of the filter bed 166 preferably consists of pebbles, but also may consist of broken stone or cement clinkers having a particle size of 1.5 to 5 mm, and has an overall height of 100 to 200 mm, the particle size and height of the filter bed being correlated in such a manner that the bed has a filter capacity of at least 1.5 kg dust per hour and square meter of horizontal filter bed surface at a gas flow of 1,000 to 3,000 cubic meters per hour and square meter. It is difficult to maintain continuous operation economically with filter beds not satisfying these conditions.

The granular filter material is most effective when it has a surface roughness of 10 to 50 percent of the selected particle size. The flow velocities of the gas should be adjusted in such a manner that the gas and the fine dust particles suspended therein impinge on the surface of the filter bed at a velocity of 0.55 to 0.85 meters per second. At these velocities, the particles of fine dust deposited on the granular filter material constitute nuclei of agglomeration to which additional dust particles adhere. The effective surface of the filter bed thus becomes significantly larger than the sum of the surfaces of the granular particles which initially constitute the filter bed. The direction in which the dust particles reach the filter surface should be 15° to 75° to the surface.

Adequate purification of the raw gas under economically sound conditions is achieved when each filter chamber is operated for at least 20 minutes in the filtering mode described above with reference to the chamber 164 between successive regenerating procedures in which dust particles are removed from the filter bed by reverse flow of scavenging gas as illustrated in FIG. 14 with reference to the filter chamber 155 whose upper compartment also is connected with the intake manifold 163 while its lower compartment 172 permanently communicates with the purified-gas manifold 173 in a manner not explicitly shown in FIG. 14.

Scavenging gas is drawn from the manifold 173 through the bottom 167 and the filter bed 166 of the filter chamber 165 as indicated by arrows 174. Simultaneously, the drive motor 169 is energized to move the agitator 168 whose tines 170 connected by a wire or wires 171 shake up each pebble or other filter particle in the bed 166. The wires 171 should have a diameter substantially smaller than the size of the filter particles to avoid breaking the particles. When the free ends of the tines slide along the perforated bottom sheet 167, they dislodge agglomerated fine dust particles from the openings and keep the bottom sheet clean to maintain its permeability to the gas.

The dust particles separated from the filter particles by the agitator 168 are entrained by the scavenging gas. The raw gas manifold is blocked by a valve 175 before the regenerating operation so that the scavenger gas charged with dust particles is directed into a dust separator 177. A properly designed cyclone separator can remove about 80 percent by volume of the entrained fine dust from the heavily contaminated scavenging gas, and only 20 percent of the fines are recycled with the scavenging gas through a conduit 179 to the intake conduit at 180 and constitutes a portion of the raw gas mixture 160' which enters the process. About one quarter of the recycled fines is coprecipitated with the coarse fraction of the raw gas in the preliminary separator 161, and the material 162' discharged from the separator contains a significant amount of fines. The remaining recycled fines, 15 percent of the amount removed from a filter bed during regeneration, enter the filter chamber 164 as indicated by the arrow 163'. During normal operation of the filter arrangement of the invention, the amount of fine particles retained by the filter beds is sufficient to make the content of such fine particles in the discharged, purified gas not more than 13 percent by volume of the fine particles entrained in the scavenger gas during the regeneration phase of continuous operation.

The percentage of fine dust retained on the filter bed 166 can be increased substantially by agglomerating the fines in the intake before they reach the filter chamber. This can be done effectively by admixing to the raw gas a finely dispersed reactive material preferably being introduced behind the separator 161. Suitable reactive materials include $MgO$, $CaO$, $Mg(OH)_2$, $Ca(OH)_2$, diatomaceous earth, coaldust, which also may perform the additional function of absorbing noxious components, such as oxides of sulfur and nitrogen and carbon monoxide, from the raw gas.

Agglomeration of fine dust particles and more complete retention on the filter bed 166 can also be achieved by ionizing the raw gas, preferably after it is stripped of coarse particles in the separator 161 and before it enters the filter chamber 164. The fine dust particles suitably charged to a high voltage in a known manner are more firmly attached to the filter particles.

While all separators explicitly described and illustrated in this specification are cyclones which rely on centrifugal forces for removing suspended solids from a gas, it will be understood that bag filters and other conventional devices may be substituted for the cyclone-type separators if and when desired. Other modifications and substitutions will readily suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A filter arrangement for separating suspended solid particles from a raw gas comprising, in combination:
   a. two groups of filter chambers arranged in respective rows;
   b. a horizontally extending wall vertically separating a first compartment from a second compartment in each chamber,
      1. said wall being permeable to gas flowing between said compartments while retaining solid particles suspended in said gas when the gas flows from said second compartment toward said first compartment through said wall,
      2. said wall including a foraminous support member and a filter bed of granular material supported on said member;
   c. a purified gas manifold permanently communicating with each of said first compartments;
   d. a single branch conduit leading out of each of said second compartments;
   e. a raw gas intake including a manifold portion interposed between said rows,
      1. each branch conduit having an end portion remote from the associated second compartment and located below said manifold portion;
   f. scavenging gas discharge means including two scavenging gas conduits located below said end portions;
   g. valve means associated with each of said branch conduits for alternatively connecting the associated branch conduit with said raw gas intake and said scavenging gas discharge means,
      1. said valve means being arranged in two rows, each valve means being operatively interposed between the end portion of the associated branch conduit, said manifold portion, and one of said scavenging conduits;
   h. centrifugal separator means in said intake for removing suspended coarse particles from the raw gas before said raw gas is admitted to said filter chambers;
   i. separating means connected to said scavenging gas discharge means for separating solid particles from scavenging gas flowing outward of said second compartments through said discharge means;
   j. a circulating fan having a suction port connected to said separating means and a pressure port connected to said raw gas intake ahead of said centrifugal separator means; and
   k. an exhaust fan connected to said purified gas manifold for drawing raw gas and scavenging gas separated from solid particles into said centrifugal separator means and for discharging purified gas from said manifold.

2. An arrangement as set forth in claim 1, wherein said exhaust fan means has a suction port directly connected to said manifold.

3. An arrangement as set forth in claim 1, wherein each valve means includes a first valve seat interposed between the associated branch conduit and said manifold portion and a second valve seat interposed between said associated branch conduit and one of said scavenging conduits, a valve member, and actuator means for moving said valve member between two positions of sealing engagement with said valve seats respectively, said actuating means including a rod member passing through said one scavenging conduit in sealing engagement and fastened to said valve member.

4. An arrangement as set forth in claim 1, wherein the particle size of said granular material is between 1.5 and 5 millimeters, the height of said filter bed is between 100 and 200 millimeters, the particles of said granular material have a roughness between 10 and 50 percent of the size thereof, and each filter bed has a filtering capacity of at least 1.5 kg of said suspended solid particles per hour and square meter of said bed in a horizontal plane at a gas flow of 1,000 to 3,000 cubic meters per hour and square meter of said bed in said horizontal plane.

5. An arrangement as set forth in claim 4, wherein said circulating fan means and said exhaust fan means jointly include means for making the velocity of impact of said gas on said filter bed between 0.55 and 0.85 meters per second.

* * * * *